United States Patent [19]

Sandstrom

[11] Patent Number: 4,502,520
[45] Date of Patent: Mar. 5, 1985

[54] PNEUMATIC TIRE HAVING AIR RETENTION INNERLINER

[75] Inventor: Paul H. Sandstrom, Tallmadge, Ohio

[73] Assignee: The Goodyear Tire & Rubber Company, Akron, Ohio

[21] Appl. No.: 595,860

[22] Filed: Apr. 2, 1984

[51] Int. Cl.³ ............................ B60C 9/00; B60C 5/14
[52] U.S. Cl. ................................ 152/330 R; 152/374; 152/DIG. 16; 525/187
[58] Field of Search .............. 152/330 R, 349, 354 R, 152/356 R, 374, 363, 400, 401, DIG. 16; 156/95, 97; 525/187, 186, 912, 913

[56] References Cited

U.S. PATENT DOCUMENTS

| | | | |
|---|---|---|---|
| 3,509,068 | 4/1970 | Lal ................................... | 528/377 X |
| 3,586,087 | 6/1971 | Messerly et al. ................ | 525/187 X |
| 3,639,308 | 2/1972 | Topcik ............................. | 152/330 R |
| 3,808,177 | 4/1974 | Thaler et al. ................... | 525/332.6 X |
| 4,279,284 | 7/1981 | Spadone .................. | 152/DIG. 16 X |
| 4,396,051 | 8/1983 | Ogawa et al. .............. | 152/330 R X |

*Primary Examiner*—William A. Powell
*Assistant Examiner*—Thomas Bokan
*Attorney, Agent, or Firm*—H. C. Young, Jr.

[57] ABSTRACT

A pneumatic rubber tire having an integral innerliner comprising a compounded rubber composition comprised of a sulfur cured blend of a halobutyl rubber and an unsaturated copolymer of propylene oxide and copolymerizable monomer.

5 Claims, No Drawings

PNEUMATIC TIRE HAVING AIR RETENTION INNERLINER

FIELD OF THE INVENTION

This invention relates to a pneumatic tire having an air retention innerliner.

BACKGROUND OF THE INVENTION

The inner surface of pneumatic rubber tires is typically comprised of a rubbery, elastomeric composition designed to prevent or retard the permeation of air and moisture into the carcass from the tire's air chamber. The portion of the tire containing such inner surface is often referred to as an innerliner. Innerliners have also been used for many years in tubeless pneumatic vehicle tires to retard or prevent the escape of air used to inflate the tire, thereby maintaining tire pressure. Rubbers which are relatively impermeable to air are often used as a major portion of said innerliners and can include butyl rubber and halobutyl rubbers. U.S. Pat. No. 3,808,177 discloses other polymers which may also be relatively impermeable.

The innerliner is normally prepared by conventional calendering or milling techniques to form a strip of uncured compounded rubber, which is sometimes referred to as a gum strip. Typically, the gum strip is the first element of the tire to be applied to a tire building drum, over and around which the remainder of the tire is built. When the tire is cured, such innerliner becomes an integral, co-cured, part of the tire.

The preparation of a gum strip composed entirely of compounded chlorobutyl or bromobutyl rubber has been observed to have some processing and fabrication problems such as sticking to processing equipment during the milling and calendering operations.

Furthermore, it has sometimes been desired to provide a gum strip composition for the innerliner which has both an enhanced building tack in its uncured state and a good cured adhesion to the tire carcass while also having a satisfactory degree of air impermeability.

Therefore, it is desired to provide a tire innerliner composition having enhanced processing characteristics, uncured building tack and cured adhesion to a tire carcass.

STATEMENT AND PRACTICE OF THE INVENTION

In accordance with this invention, a pneumatic rubber tire is provided having an integral innerliner comprising a compounded rubber composition comprised of a blend of halobutyl rubber and an unsaturated copolymer of at least one alpha-olefin oxide and copolymerizable monomer. Such blend is preferably comprised of about 50 to about 98 parts by weight of a halobutyl rubber selected from chlorobutyl and bromobutyl rubbers and about 50 to about 2 parts by weight, or phr, (parts by weight per 100 parts by weight halobutyl rubber and copolymer) of at least one unsaturated copolymer of an alpha-olefin oxide and copolymerizable monomer.

Therefore, as a particular embodiment of this invention, a pneumatic rubber tire is provided having an integral innerliner comprising a compounded rubber composition comprised of a sulfur cured blend of about 50 to about 98, preferably about 80 to about 95, phr of at least one halobutyl rubber selected from chlorobutyl rubber and bromobutyl rubber and about 50 to about 2, preferably about 20 to about 5, phr of at least one unsaturated copolymer of propylene oxide and about 0.5 to about 20, preferably about 2 to about 10, weight percent based on the propylene oxide of at least one copolymerizable monomer selected from butadiene monoxide, isoprene monoxide, 1,2-epoxy-3-allyloxypropane (allyl glycidyl ether) and limonene monoxide. The preferred copolymerizable monomer is allyl glycidyl ether.

In practice, the innerliner composition is first prepared as an uncured compounded rubber gum strip, constructed as an inner surface (exposed inside surface) of an uncured rubber tire structure, (carcass), and sulfur co-cured with the tire carcass during the tire curing operation under conditions of heat and pressure. Thus, the innerliner becomes an integral part of the tire by being co-cured therewith as compared to being a simple adherent laminate.

The innerliner rubbers can be compounded with conventional rubber compounding ingredients comprised of carbon black, zinc oxide, stearic acid, rubber processing oil, sulfur, accelerator and antidegradant and then typically extruded and/or calendered to form the uncured gum strip.

The preferred unsaturated polymer of alpha-olefin oxide is a copolymer of propylene oxide and allyl glycidyl ether. Such copolymer and a method for its preparation is disclosed in U.S. Pat. No. 3,509,068. The disclosure and description contained in such patent is hereby incorporated into this specification by reference.

An important feature of this invention is the discovery that the halobutyl rubber/alpha-olefin oxide copolymer blend provides a sulfur curable tire innerliner composition which has been observed to provide an improvement in its rubber compound processability and uncured building tack and also its cured adhesion to a rubber tire carcass compound as compared to a tire innerliner composition composed only of the halobutyl rubber as its polymer component. Although the innerliner rubber blend composition has been observed to exhibit an increase in air permeability as compared to the halobutyl rubber innerliner composition, it is considered that the resultant air permeability of the polymer blend is satisfactory, particularly in view of its observed enhanced processability.

The uncured tire carcass rubber interface with which the innerliner is sulfur co-cured can be of various sulfur curable rubber and rubber blends such as, for example, polybutadiene, polyisoprene and styrene/butadiene copolymer rubbers.

Typically the innerliner has an uncured gum thickness in the range of about 0.03 to about 0.08 inch (0.08–0.2 cm), depending somewhat on the tire size, its intended use and degree of air retention desired.

The pneumatic tire with the integral innerliner composition may be constructed in the form of a passenger tire, truck tire, or other type of bias or radial pneumatic tire.

The practice of this invention is further illustrated by reference to the following example which is intended to be representative rather than restrictive of the scope of the invention. Unless otherwise indicated, all parts and percentages are by weight.

EXAMPLE 1

Several blend compositions of chlorobutyl rubber and copolymer of propylene oxide and allyl glycidyl ether were prepared as a compounded rubber composition by mixing in a size BR Banbury blender the chlorobutyl rubber and the copolymer as shown in the following Table 1. Additional compounding ingredients comprised of carbon black, zinc oxide, stearic acid, sulfur and accelerators were mixed with the blend as a two step mixing process in which all of the ingredients were mixed in the first step except for sulfur and accelerators which were added and mixed in the second step. The control compound A is based on the chlorobutyl rubber and experimental compounds B-E are based on the blend.

TABLE 1

INNERLINER COMPOSITION

| Components | Control Compound (phr) A | Experimental Compounds (phr) | | | |
|---|---|---|---|---|---|
| | | B | C | D | E |
| Chlorobutyl Rubber[1] | 100 | 95 | 90 | 85 | 80 |
| Propylene Oxide/ allyl glycidyl ether copolymer[2] | 0 | 5 | 10 | 15 | 20 |

[1]Chlorobutyl rubber obtained as HT-10-66 from Exxon.
[2]Copolymer obtained as Parel 58 from Hercules Inc.

Properties of the cured innerliner composition are shown in Table 2 with Composition A being a control as a chlorobutyl rubber and Compositions B-E being the experimental compositions as the rubber blends. The compositions had been cured for about 36 minutes at about 150° C.

TABLE 2

INNERLINER COMPOSITION PROPERTIES

| Properties | | Control Compound A | Experimental Compounds | | | |
|---|---|---|---|---|---|---|
| | | | B | C | D | E |
| Rheometer 300° F. (150° C.) | Max Torque | 22.6 | 24.0 | 24.4 | 24.9 | 25.2 |
| | Min Torque | 11.6 | 11.0 | 10.7 | 10.9 | 10.8 |
| | Delta Torque | 11.0 | 13.0 | 13.7 | 14.0 | 14.4 |
| | $T_{90}$ (minutes) | 16.25 | 48.0 | 48.5 | 49.5 | 49.5 |
| | $T_2$ (minutes) | 7.25 | 11.5 | 11.75 | 13.25 | 14.5 |
| Ultimate Tensile MPa | | 8.0 | 9.0 | 8.5 | 8.4 | 8.6 |
| Ultimate Elongation % | | 930 | 935 | 910 | 910 | 910 |
| 100% Modulus MPa | | 0.6 | 0.7 | 0.8 | 0.8 | 0.8 |
| 300% Modulus MPa | | 1.9 | 2.1 | 2.2 | 2.3 | 2.2 |
| Shore A Hardness | | 50 | 51 | 52 | 52 | 50 |
| Ketjen Tack Newtons | To: Itself | 27 | 30 | 28 | 29 | 24 |
| | Carcass Stock[1] | 8 | 10 | 11 | 11 | 12 |
| | Chafer Stock[2] | 4 | 4 | 4 | 4 | 4 |
| | Apex Stock[3] | 6 | 7 | 8 | 10 | 17 |
| Peel (180°) Adhesion 93° C.; Newtons | To: Itself | 90* | 102* | 102* | 102* | 115* |
| | Carcass Stock[1] | 41 | 43 | 66* | 68* | 67* |
| | Chafer Stock[2] | 72* | 72* | 66* | 78* | 74* |
| | Apex Stock[3] | 76* | 79* | 77* | 77* | 87* |
| Air Permeability Ratio of Experimental Compound to Chlorobutyl Control Compound (ASTM D1434) | | 1.0 | 1.10 | 1.14 | 1.54 | 1.70 |

*Sample failure at fabric backing rather than at stock innerface.
[1]Blend of natural (polyisoprene) and styrene/butadiene copolymer rubbers.
[2]Styrene/butadiene copolymer rubber.
[3]Blend of natural (polyisoprene) and polybutadiene rubbers.

The compounded rubber compositions were calendered into strips with fabric backing having a thickness of 0.055 inches and 8 inches wide for preparation of Ketjen tack and peel adhesion test samples and calendered into strips having a thickness of 0.022 inch and 8 inches wide for air permeability test samples prior to curing.

A comparison of cure behavior, stress strain properties (tensile and elongation), tack and cured adhesion to other tire components, and air permeability has been shown in Table 2.

Although the experimental blend compositions B-E exhibited a slower rate of cure when compared to the control A, the stress strain properties of tensile and elongation were observed to be comparable. The slower rate of cure of the blend compositions B-E was not considered to be a serious consideration since the innerliner is in direct contact with the hot cure bladder during the tire cure cycle.

All of the tested compounds were observed to exhibit excellent tack to themselves and poorer tack to the representative chafer stock, whereas the experimental blend compositions were observed to show improved tack to representative apex and carcass stocks when compared to the control.

The cured adhesion of the test compounds to themselves or to representative apex or chafer stocks cannot be directly or easily compared on a numerical basis since the failures occurred at the fabric backing instead of the stock interface. These results indicate, however, that adequate adhesion should exist between these rubber compounds. In the case of cured adhesion to the representative carcass stock, the control test sample A exhibited adhesive failure at the interface between the cured rubber compounds. In contrast, the blends containing 10 to 20 phr of the copolymer exhibited higher values of cured adhesion, which were actually failures at the fabric backing, and are therefore considered to have higher adhesion to the representative carcass stock.

Although the experimental blends exhibited a steady increase of air permeability relative to the control ($1.1/_1$ to $1.7/_1$) as the level of the copolymer in the blend is increased from 5 to 20 phr, it is considered that the air permeability is within satisfactory limits. Indeed, a natural rubber sample of the same thickness would be expected to demonstrate an air permeability ratio of about 10/1 as compared to control sample A. Thus, even in the worst case, the air permeability of sample E would be about 6 times less than a comparable sample of natural rubber compound.

The processing of the samples B-E was noticeably improved over control sample A. During the milling and calendering operation prior to testing, the blend compositions, particularly at the 10 to 20 phr level of the copolymer in the blend, were observed to be easier to process as a result of less sticking to a two roll breakdown mill and the calender used to prepare the test samples. In particular, the control composition A was found to be more difficult to remove from the roll mill (because of its sticking to a roll) and also more difficult to calender as a gum strip (because of sticking to a calender roll) than the experimental compositions B-E.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having an integral innerliner comprising a compounded rubber composition comprised of a sulfur cured blend of about 50 to about 98 phr of at least one halobutyl rubber selected from chlorobutyl rubber and bromobutyl rubber and about 50 to about 2 phr of at least one unsaturated copolymer of propylene oxide and about 0.5 to about 20 weight percent based on the propylene oxide of at least one copolymerizable monomer selected from butadiene monoxide, isoprene monoxide, 1,2-epoxy-3-allyloxypropane (allyl glycidyl ether) and limonene monoxide.

2. The tire of claim 1 where, in said innerliner composition, said propylene oxide copolymer is a copolymer of propylene oxide and allyl glycidyl ether.

3. The tire of claim 2 where the halobutyl rubber of said innerliner composition is chlorobutyl rubber.

4. The tire of claim 1 having an integral innerliner comprising a compounded rubber composition comprised of a sulfur cured blend of about 80 to about 95 phr of at least one halobutyl rubber selected from chlorobutyl rubber and bromobutyl rubber and about 20 to about 5 phr of at least one unsaturated copolymer of propylene oxide and about 2 to about 10 weight percent based on the propylene oxide of at least one copolymerizable monomer selected from butadiene monoxide, isoprene monoxide, 1,2-epoxy-3-allyloxypropane (allyl glycidyl ether) and limonene monoxide.

5. A pneumatic rubber tire having an integral innerliner comprising a compounded rubber composition comprised of a sulfur cured blend of about 80 to about 95 phr of chlorobutyl rubber and about 20 to about 5 phr of an unsaturated copolymer of propylene oxide and about 2 to about 10 weight percent based on the propylene oxide of allyl glycidyl ether.

* * * * *